US008693334B2

(12) United States Patent
Dattagupta et al.

(10) Patent No.: US 8,693,334 B2
(45) Date of Patent: Apr. 8, 2014

(54) SYSTEM AND METHOD FOR IMPROVED DATA TRANSMISSION RELIABILITY OVER A NETWORK

(75) Inventors: Siddhartha Dattagupta, Fullerton, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 499 days.

(21) Appl. No.: 13/105,264

(22) Filed: May 11, 2011

(65) Prior Publication Data

US 2011/0211451 A1    Sep. 1, 2011

Related U.S. Application Data

(63) Continuation of application No. 12/366,604, filed on Feb. 5, 2009, now Pat. No. 8,009,567.

(51) Int. Cl.
*H04W 28/10* (2009.01)
*H04W 52/26* (2009.01)
*H04L 1/14* (2006.01)
*H04L 12/26* (2006.01)
*G08C 25/02* (2006.01)

(52) U.S. Cl.
USPC ........... 370/235; 370/236; 370/252; 370/318; 370/395.64; 370/328; 455/69; 455/522; 714/748

(58) Field of Classification Search
USPC .............. 370/229–234, 235–236, 230.1, 252, 370/318, 328, 338, 389, 395.64; 455/69, 455/522; 709/223, 224, 233; 714/748–750
See application file for complete search history.

(56) References Cited

U.S. PATENT DOCUMENTS

| | | | |
|---|---|---|---|
| 6,856,756 B1 | 2/2005 | Mochizuki et al. | |
| 6,907,005 B1 * | 6/2005 | Dahlman et al. | 370/236 |
| 6,992,986 B2 * | 1/2006 | Reza et al. | 370/252 |
| 7,292,553 B2 | 11/2007 | Tiedemann et al. | |
| 7,706,384 B2 | 4/2010 | Van Beek | |
| 7,782,779 B2 | 8/2010 | Pozhenko et al. | |

(Continued)

FOREIGN PATENT DOCUMENTS

| | | |
|---|---|---|
| EP | 1 879 396 A2 | 1/2008 |
| WO | WO 03/007551 A1 | 1/2003 |
| WO | WO 2010/090796 | 8/2010 |

OTHER PUBLICATIONS

PCT Aug. 18, 2011 International Preliminary Report on Patentability and Written Opinion of the International Searching Authority from PCT/US2010/020761; 8pages.

(Continued)

*Primary Examiner* — Candal Elpenord
(74) *Attorney, Agent, or Firm* — Patent Capital Group

(57) ABSTRACT

In one example embodiment, a method is provided and includes identifying a first data type of a first payload of a first data packet to be transmitted as part of a flow, where the first data type is identified by evaluating a quality of service (QoS) field, and setting an acknowledgement flag based on the first data type; the acknowledgement flag to indicate that an acknowledgement is not required from a receiving device such that a network device avoids retransmitting a first outgoing frame when the acknowledgement is not received for the first outgoing frame. In more particular instances, the method can include where the acknowledgement flag is in the first outgoing frame.

17 Claims, 5 Drawing Sheets

(56) References Cited

U.S. PATENT DOCUMENTS

| | | | |
|---|---|---|---|
| 2001/0025239 | A1 | 9/2001 | Hakenberg et al. |
| 2003/0133462 | A1 | 7/2003 | Schoenblum |
| 2004/0072541 | A1 | 4/2004 | Morgan et al. |
| 2005/0141480 | A1 | 6/2005 | Jin et al. |
| 2006/0002465 | A1 | 1/2006 | Raveendran et al. |
| 2006/0095944 | A1 | 5/2006 | Demircin et al. |
| 2007/0009015 | A1 | 1/2007 | Kunii et al. |
| 2007/0217339 | A1 | 9/2007 | Zhao |
| 2007/0242627 | A1* | 10/2007 | Thai et al. ............... 370/278 |
| 2008/0002592 | A1* | 1/2008 | Yegani et al. ............ 370/252 |
| 2008/0101476 | A1 | 5/2008 | Tian et al. |
| 2008/0205385 | A1* | 8/2008 | Zeng et al. .............. 370/389 |
| 2008/0209494 | A1* | 8/2008 | Dravida et al. ........... 725/129 |
| 2008/0225983 | A1 | 9/2008 | Lee et al. |
| 2008/0235553 | A1* | 9/2008 | Chintada et al. .......... 714/749 |
| 2009/0034610 | A1 | 2/2009 | Lee et al. |
| 2010/0195499 | A1 | 8/2010 | Dattagupta et al. |

OTHER PUBLICATIONS

EPO Mar. 21, 2012 Response to Written Opinion from European Application No. 10701063.9; 11 pages.

Lu, Mei-Hsuan et al., "Video Streaming Over 802.11 WLAN with Content-Aware Adaptive Retry," Department of Electrical and Computer Engineering, Carnegie Mellon University; © 2005 IEEE, 4 pages.

PCT, "Notification of Transmittal (1 page) of the International Search Report (4 pages) and the Written Opinion of the International Searching Authority, or the Declaration (6 pages)," International Application No. PCT/US2010/020761 mailed Mar. 16, 2010.

Yang Xiao, et al., "A Cross-Layer Approach for Frame Transmissions of MPEG-4 Over the IEEE 802.11e Wireless Local Area Networks," Wireless Communications and Networking Conference, Mar. 31, 2008, XP031243893, ISBN 978-1-4244-1997-5, © 2008 IEEE, pp. 1728-1733.

"IEEE Standard for Information Technology—Telecommunications and Information Exchange Between Systems-Local and Metropolitan Area Networks-Specific Requirements, Part 11: Wireless LAN Medium Access Control (MAC) and Physical Layer (PHY) Specifications, Amendment 8: Medium Access Control (MAC) Quality of Service Enhancements," Jan. 1, 2005, XP017601998, ISBN 978-0-7381-4772-7, © 2005 IEEE, 210 pgs.

Yang Xiao, "IEEE 802.11E: QoS Provisioning at the MAC Layer," IEEE Wireless Communications, vol. 11, No. 3, Jun. 1, 2004, XP001217419, ISSN 1536-1284, © 2004 IEEE, pp. 72-79.

* cited by examiner

SYSTEM AND METHOD FOR IMPROVED DATA TRANSMISSION RELIABILITY OVER A NETWORK

RELATED APPLICATION

This Application is a continuation (and claims the benefit of priority under 35 U.S.C. §120 of U.S. application Ser. No. 12/366,604, filed Feb. 5, 2009, now U.S. Pat. No. 8,009,567 entitled "SYSTEM AND METHOD FOR IMPROVED DATA TRANSMISSION RELIABILITY OVER A NETWORK," Inventor(s) Siddhartha Dattagupta, et al. The disclosure of the prior application is considered part of (and is incorporated by reference in) the disclosure of this application.

TECHNICAL FIELD OF THE INVENTION

This invention relates in general to the field of communications and, more particularly, to a system and a method for improved data transmission in a network environment.

BACKGROUND OF THE INVENTION

Networks have grown increasingly complex in today's communications environments. Networks can use quality of service (QoS) fields in network data to indicate per hop priority, which network infrastructure can use when handling particular types of data. This can enable the network to behave according to the priority of the data packets such that the QoS field controls packet prioritization through queuing, scheduling, and dropping of packets for hops across the network. This per hop handling does not affect transmission reliability and it does not affect how reliably an individual data packet is received without error.

BRIEF DESCRIPTION OF THE DRAWINGS

Example embodiments will now be described, by way of example only, with reference to the accompanying drawings, in which.

DETAILED DESCRIPTION OF EXAMPLE EMBODIMENTS

Overview

A method is provided in one example embodiment and includes identifying a first data type of a first payload of a first data packet to be transmitted as part of a flow, where the first data type is identified by evaluating a quality of service (QoS) field, and setting an acknowledgement flag based on the first data type; the acknowledgement flag to indicate that an acknowledgement is not required from a receiving device such that a network device avoids retransmitting a first outgoing frame when the acknowledgement is not received for the first outgoing frame. In more particular instances, the method can include where the acknowledgement flag is in the first outgoing frame.

In other examples, a data transmission rate is adapted according to the first data type, where a packet size for selected packets of the flow is changed based on identifying the first data type; and a transmission power for the flow is changed on a per-frame basis, where the transmission power is configured according to the first data type such that high-priority packets are transmitted with a higher power than low priority packets, which are transmitted at a reduced power. In one particular embodiment, the data transmission rates are controlled by one or more link layer configuration parameters, which are controlled according to the first data type.

In other implementations the first outgoing frame is transmitted at a first transmission power level, where the first transmission power level is less than an average transmission power level; and a second outgoing frame is transmitted at a second transmission power level, where the second transmission power level is greater than the average transmission power level. In other examples, a second data type of a payload of a second data packet to be transmitted as part of the flow is identified, where the second data type is identified by evaluating the quality of service (QoS) field and the acknowledgement flag is not set; a second outgoing frame using first transmission characteristics is transmitted; and the second outgoing frame is retransmitting when the acknowledgement is not received using second transmission characteristics, where the second transmission characteristics are different than the first transmission characteristics.

Example Embodiments

Figure 1:
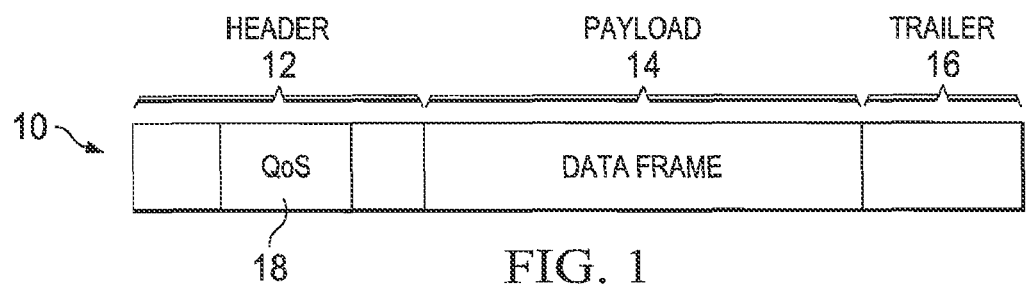
FIG. 1 is an example schematic representation of a data packet.

Referring to FIG. 1, there is shown an example embodiment of a data packet 10, which is a formatted block of data comprising a control portion and a payload 14. In this embodiment, the control portion comprises a header portion 12 at the beginning of data packet 10 and a trailer portion 16 at the end of data packet 10. In some embodiments, there may not be trailer portion 16. The control portion generally provides control information relating to the transport of data packet 10, while payload 14 comprises substantive data being transported. In one embodiment, data packet 10 is an Internet Protocol (IP) packet. An IP packet payload usually comprises transport layer data such as Transmission Control Protocol (TCP) data. The payload may comprise other forms of data such as a User Datagram Protocol (UDP) packet. In one embodiment, the control portion is an IP header.

In an embodiment, the control portion comprises a Quality of Service (QoS) field 18, which comprises control information for per hop handling of data packet 10 by a network when transferring data packet 10. 802.11e comprises QoS differentiation according to voice, video, best effort, and background packet types. Typically the QoS field designates the priority at which the data packet is handled relative to the priority of other data packets of other types. The QoS field is typically used by each network device to queue packets, or drop packets: depending on the packet priority and the bandwidth availability. Other QoS differentiations can be used such as specified by the Universal Plug and Play (UPnP) Forum. Other types of identification of data type can also be used such as direct inspection and analysis of the data in payload 14.

Figure 2:
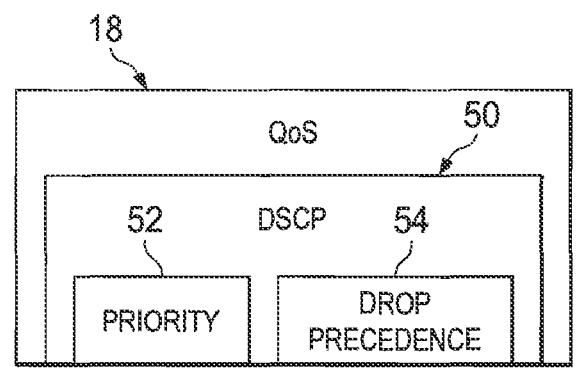
FIG. 2 is an example schematic representation of a portion of the data packet of FIG. 1.

Referring to FIG. 2, in this embodiment, QoS field 18 has a Differentiated Services Code Point (DSCP) portion 50, which has a priority portion 52 and a drop precedence portion 54. DSCP portion 50 may be for example 6 bits of a DiffSery field. A Type of Service (ToS) byte may be used instead of a DiffSery field. DSCP portion 50 is used to select per hop behavior of the data packet. Priority portion 52 signifies a class (type) of the data. Drop precedence portion 54 signifies a drop probability or relative acceptability of dropping data packet 10.

In an embodiment, priority portion 52 and drop precedence portion 54 are allocated appropriate values according to the type of data carried by each respective packet. The QoS field is intended to be used only at the Internet layer (or network layer or L3 layer) of the network. However in embodiments of this disclosure, the QoS field can be used to identify a data packet type for differential treatment according to data type by lower network levels to control one or more data transmission characteristics of the transmitter connected to the network, as described further below.

Data transmission characteristics can be regarded as the manner in which the transmitter transmits the data: rather than the handling of packets in readiness for transmission. Such handling in readiness of transmission consists of buffering, queuing, scheduling, and dropping of packets and occurs prior to transmission. Thus, once a packet has been buffered, queued, scheduled, and is not dropped it is provided to lower levels of a network device for transmission. It is the transmission characteristics that control how the data packet is transmitted.

Figure 3A:
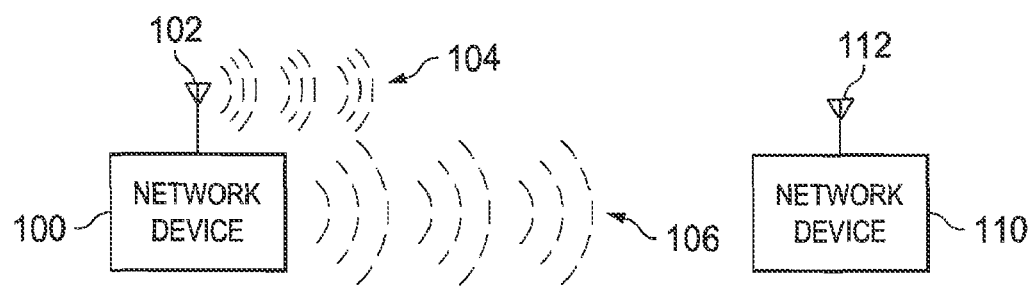
FIG. 3A is a schematic representation of an example embodiment of a network and an embodiment of a data transmission between two network devices of the network.

Wireless networks can have unreliable transmission quality, often due to interference. An example embodiment is described in relation to a wireless network, although it will be realized that the network need not be a wireless network. Referring to FIG. 3A, there is an embodiment of a network formed by a first wireless network interface device 100 and a second wireless network interface device 110. Each device 100 and 110 has a respective antenna 102 and 112 for receiving and transmitting data. For example, the wireless devices may transmit at frequencies of 2.4 GHz or 5 GHz and may comply with 802.11 a/b/g/n, or they may use other frequencies and/or other modulation techniques/protocols. Network device 100 may be, for example, a Wireless Network Interface Card, an Access Point, or some other wireless network interface device: likewise for network device 110. There may be other devices in the network, which are not shown. For example, transmissions between network device 100 and network device 110 may be via an Access Point.

A transmission of a data packet from network device 100 to network device 110 is diagrammatically represented by 104. An alternative transmission of a data packet, which is transmitted at a lower data rate, is diagrammatically represented as 106. Network device 100 may have adaptable data transmission characteristics that allow the network device to transmit at the lower data transfer rate; that is, the rate of transmission of bits of the data packet is slower in transmission 106 than the rate of transmission 104.

Figure 3B:
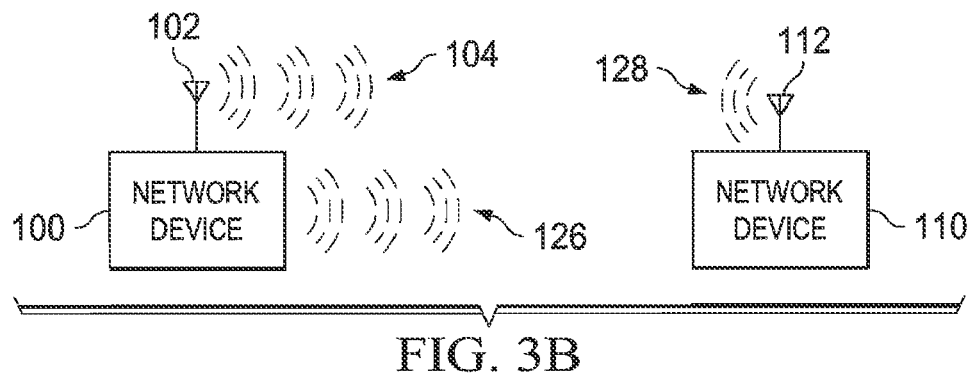
FIG. 3B is a schematic representation of the embodiment of the network of FIG. 3A and an alternative embodiment of a data transmission between two network devices of the network.

FIG. 3B shows the same devices 100 and 110 and transmission 104. Also shown is an acknowledgement transmission 128 from device 110 to 100 and a retransmission 126 of a data packet, which would usually be sent in the event that acknowledgment transmission 128 was not received by device 100 within an expected time frame. The acknowledgement may not be received by device 100 because transmission 104 was not received, the acknowledged transmission 128 was not received, or device 110 was controlled so as to not send acknowledgement transmission 128. Network device 110 may have adaptable data transmission characteristics that allow network device 110 to not acknowledge receipt of transmission 104; that is, not produce acknowledgement transmission 128 even if transmission 104 was successfully received. Network device 100 may have adaptable data transmission characteristics that allow network device 100 to not retransmit transmission 104, even though it has not been acknowledged; that is, even if acknowledgement transmission 104 was successfully received there is no retry transmission 126.

Figure 3C:
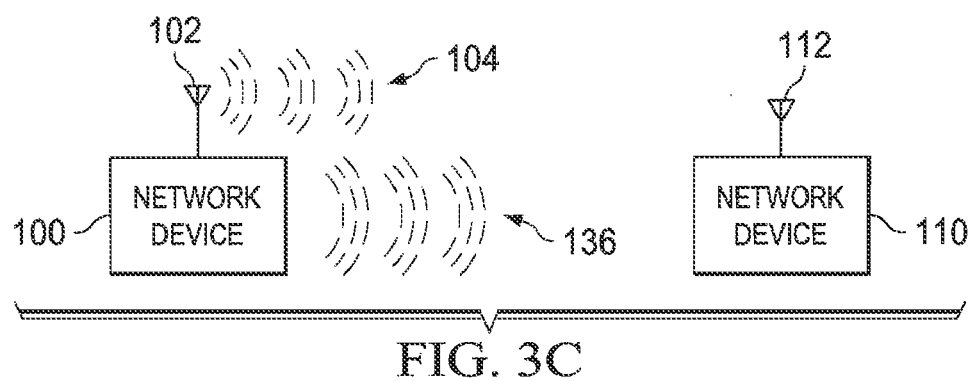
FIG. 3C is a schematic representation of the embodiment of the network of FIG. 3A and an alternative embodiment of a data transmission between two network devices of the network.

FIG. 3C shows the same devices 100 and 110 and transmission 104. In this case, another transmission 136 of a data packet is shown diagrammatically with a greater power than transmission 104. Network device 100 may have adaptable data transmission characteristics that allow network device 100 to transmit at a higher power than the power of transmission 104.

Figure 3D:
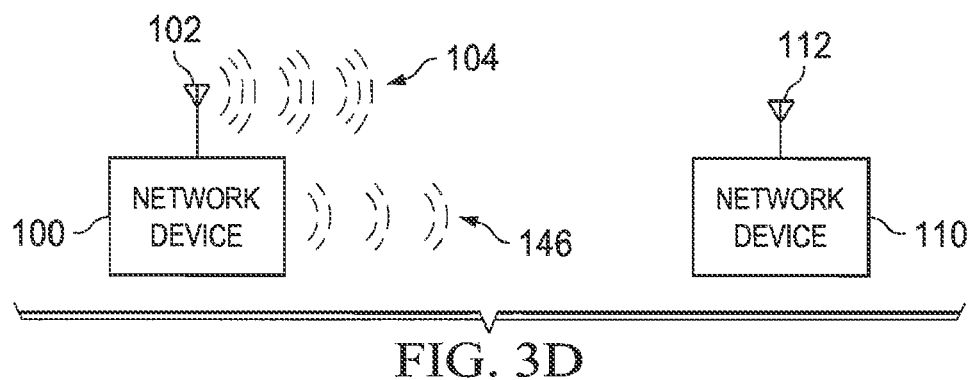
FIG. 3D is a schematic representation of the embodiment of the network of FIG. 3A and an alternative embodiment of a data transmission between two network devices of the network.
Figure 3E:
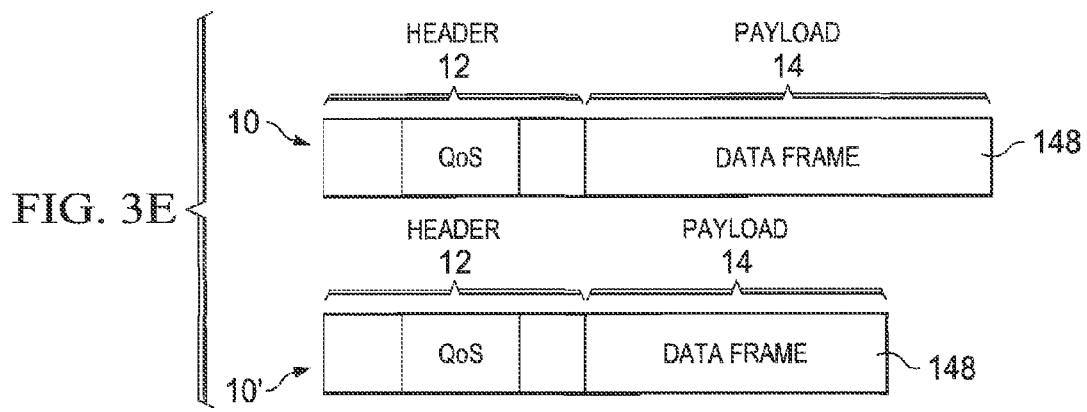
FIG. 3E is a schematic representation of an example embodiment of one type of data packet compared to an embodiment of another type of data packet.

FIG. 3D shows the same devices 100 and 110 and transmission 104. In this figure, another transmission 146 of a data packet is diagrammatically represented as being shorter in length that transmission 104. This may be achieved in a number of ways. In an embodiment, the payload of the data packet is broken up into a number of smaller pieces prior to transmission. Network device 100 may have adaptable data transmission characteristics that allow network device 100 to split the data packet into two or more smaller transmissions 146. FIG. 3E also diagrammatically represents a packet of shorter length due to the size of the payload 148 being smaller.

Figure 4:
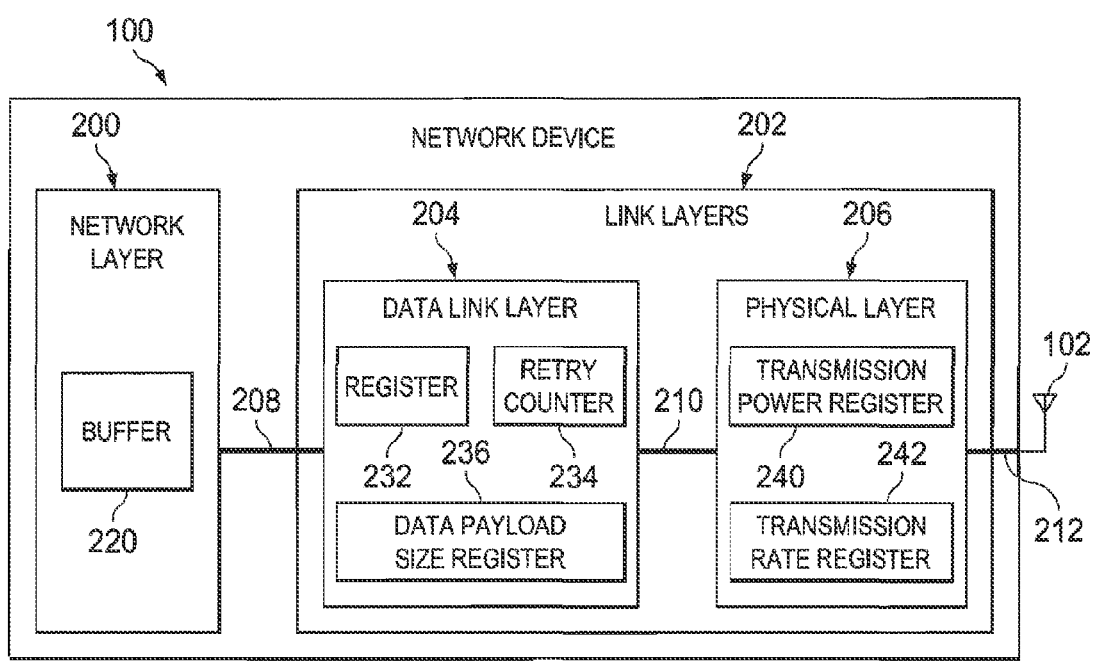
FIG. 4 is a schematic block diagram of an example embodiment of a network device.

Referring to FIG. 4, an embodiment of network device 100 is shown in more detail. In an embodiment, network device 100 is comprised of electronic circuitry including one or more data processing devices electronically coupled to an antenna 102 for transmitting data by radio frequency signal. In an embodiment, the one or more data processors and electronic circuitry are configured to operate under the control of logic embodied in tangible media. In an embodiment, the logic is in the form of a computer program or firmware, which comprises instructions, which when executed control the one or more data processors to operate as a network layer 200 (also known as an Internet layer or L3 layer) and a control link layer 202 (also known as a network interface layer), which may comprise a data link layer 204 (also known as L2 layer), and a physical layer 206 (also known as L1 layer).

Network layer 200 receives data from other higher layers of network device 100 or other external layers or equipment.

For example, it may receive data from a transport layer (also known as L4 layer), which uses TCP or UDP or other protocols. A TCP segment can have network control information added, typically in the form of a header to application data. The TCP header and application data will form the payload of the IP data packet. Network layer 200 will pass the data packet by a coupling 208 to data link layer 204. Data link layer 204 processes the transmission of packets using the data link transmission protocol designated to network device 100. Typically, link layer 202 will be designated with only one data link transmission protocol with examples given below. In some cases, network layer 200 may be coupled to a plurality of link layers 202 such as, for example, if network device 100 has an Ethernet network interface and a wireless network interface.

In this embodiment, network device 100 comprises a wireless network interface, which [for example] complies with the IEEE 802.11 protocol or sub protocols. Other embodiments may use other data link layer protocols such as Point-to-Point Protocol (PPP), frame relay, Asynchronous Transfer Mode (ATM), etc.

In the case of network device 100 comprising an Ethernet network interface, data link layer 204 will process the information according to the Ethernet protocol. In an embodiment, network device 100 comprises an electrical powerline network interface, which transmits and receives network communications over, for example, in home electronic power lines using for example Home Plug 1.0, or Home Plug AV standards or another protocol. Data link layer 204 passes the data to physical layer 206 by coupling 210. Physical layer 206 implements the encoding and transmission of data over the network medium. In this example, the medium is a radio frequency transmission, although the medium may take other forms such as optic fiber, copper cable, or other suitable medium.

Network layer 200 includes a buffer 220 for receiving data packets from the higher layer such as the transport layer for transmission. Network layer 200 may be configured to identify a data type of the packet received in buffer 220, for example, from a QoS field as described above. Network layer 200 may then control link layer 202 such that one or more of the transmission characteristics are adapted according to the identified data type of the data packet.

Data link layer 204 may comprise a register 232 indicating whether or not an acknowledgement is required before the data is retransmitted. Register 232 may be set by network layer 200 according to the data type of the data packet to be transmitted. Data link layer 204 may operate to retry or not retry when a transmitted packet is not acknowledged according to register 232. Data link layer 202 may further comprise a retry counter 234, which is used to indicate whether the transmission should be retried in the event that no acknowledgement is received and the number of retries that are permitted. Counter 234 may be set by network layer 200 according to the data type of the data packet to be transmitted. Data link layer 204 may operate to retry a transmission a number of times according to a value in counter 234 if receipt of the packet is not acknowledged. Data link layer 202 may comprise a data payload size register 236, which may be used to indicate whether to break-up a packet into smaller packets. Register 236 may be set by network layer 200 according to the data type of the data packet to be transmitted. Data link layer 204 may operate to break-up the data packet into a smaller number of packets according to register 236.

Physical layer 206 may comprise a register 240 for controlling the transmission power of the radio frequency transmissions sent by coupling 212 to antenna 102. Register 240 may be set by data link layer 204 or network layer 200 according to the data type of the data packet to be transmitted. Physical layer 206 may operate to transmit data at a power based on a value in register 240. Physical layer 204 may also comprise a register 242 for controlling the data transmission rate. Register 242 may be set by data link layer 204 or network layer 200 according to data type of the data packet to be transmitted. Physical layer 206 may operate to transmit data over a channel at a bit rate determined by register 242. Register 242 may be controlled by data link layer 204 so as to reduce the transmission rate when one or more acknowledgment transmissions are not received from the destination (e.g., device 110).

Figure 5:
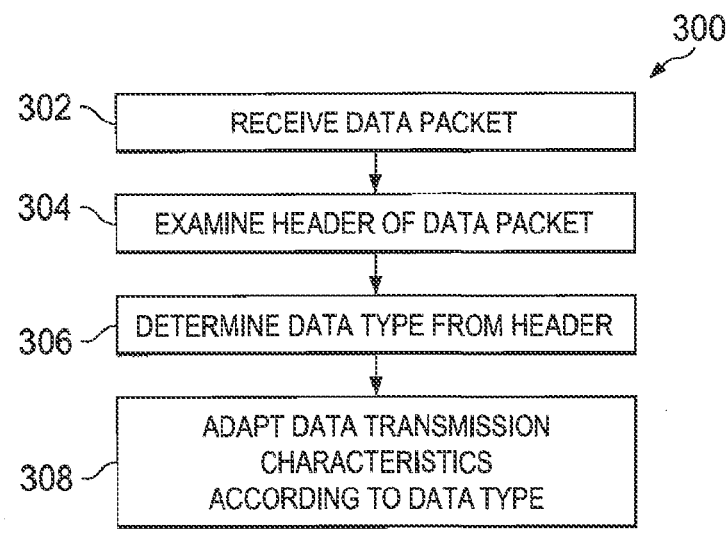
FIG. 5 is a flowchart of an example embodiment of a method for transmitting data.

Referring to FIG. 5, a method 300 for controlling network device 100 to transmit data is shown. The network device receives data packet 10 at step 302. The network device then examines the data packet at step 304 to identify a data type carried in the payload of the data packet. For example, at step 304, the data QoS field or in particular the DSCP field is used to characterize the data packet as having a particular type of data. The network device then adapts one or more data transmission characteristics according to the data type, as shown in step 308. The data transmission characteristics, which can be adapted may comprise, but are not necessarily limited to, the data transmission rate, ignoring a lack of acknowledgement transmission, limiting the number retries when no acknowledgement is received, changing the transmission power, or changing the packet size.

Normally in 802.11 communications, transmitted data packets are required to be acknowledged by the receiver. Transmitted data packets that are not acknowledged by the receiver are usually allowed to be retransmitted (which can occur a number of times, until a retransmit timer expires or retransmit counter reaches a limit) and transmitted data frames that are not acknowledged by the receiver are allowed to be retransmitted at a lower data rate (in order to improve signal to noise ratio and thus increase the probability of a successful transmission).

However, since retransmissions have the penalty of reducing throughput and increasing latency, both of which can be extremely detrimental to video quality, it is useful for some embodiments to eliminate (or at least reduce) the number of retransmissions.

Based on the data type, priority packets can be transmitted at a lower bit rate than the channel itself can allow: thus achieving a trade-off between higher throughput (with a greater probability of needing retransmission) against more reliability (deliberately reduce throughput, but also reduce or eliminate retries).

Reserving maximum transmission power for the most important packets allows the average transmission power to be less than the maximum transmission power such that the network device will comply with regulatory requirements. However, when important data is to be transmitted, the network device can exceed the average transmission power to improve reliability of these priority packets.

The transmitter power can be adapted on a per frame basis according to data type. High priority packets can be transmitted with a higher power, while those carrying lower priority packets can be transmitted at some reduced power. The average power transmitted can be kept within regulatory limits, even though individual packets might be transmitted at higher than nominal values. This can result in increased reliability by increasing transmit power (and thus increasing signal to noise ratio) on a per packet basis using the data type to indicate the level of transmitter power.

The drop precedence field can be used to map to the number of permitted retries. High priority packets, having a low drop precedence, are allowed to be retried at least once (possibly more if necessary); medium priority packets, having a medium drop precedence, may be allowed to be retried only once; and lower priority packets, would have a high drop precedence, and may not be allowed to be retried. This can result in only the most important packets being allowed more retries and the least important packets being not allowed to retry.

When smaller payloads (frames) are used for higher priority packets, a lower Packet Error Rate (PER) or Frame Error Rate (FER) can result, but at the expense of throughput for more important packets. This is also a trade-off between best possible throughput and increasing reliability and is achieved by reducing PER/FER by reducing packet size by adapting the packet size according to data type. Retransmitted packets need not be necessarily reduced in size.

The adaptations to the transmission characteristics can be used in combination or individually applied. One useful combination for increasing reliability of a data packet to be transmitted for the first time would be to reduce data rate, reduce frame size, and increase power. Even though reducing data rate increases transmit time, a concurrent reduction of packet size reduces transmit time, thus also allowing a higher transmit power to be used without violating regulatory requirements. Retransmission of a packet may use different transmission characteristics to those used when the first attempt to transmit the packet is made.

Figure 6:
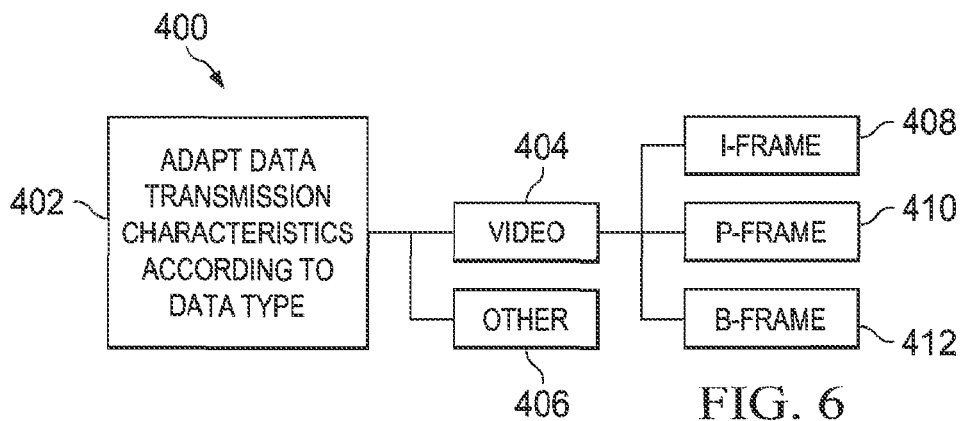
FIG. 6 is an embodiment of a block diagram of an example decision tree according to an embodiment of the method of FIG. 5.

Referring to FIG. 6, an embodiment of a process of adapting the data transmission characteristics according to data type 400 commences at step 402. This embodiment treats video data with a higher priority than other types of data, as dropped video packets can severely affect the video image displayed. However, in other embodiments, other data types can be prioritized in a similar manner. Initially the data type of each data packet is first identified as video data 404 or other data 406. Video data 404 can be signified in the priority portion 52 of the data packet. In particular (for example) video data can be indicated in a class designation of a DiffServ field. In an embodiment, the video data is encoded using the MPEG standards, which designate variable bit rate video data as one of an Intra coded frame (I-frame) 408, a Predicted picture frame (P-frame) 410, or a Bi-directional predicted picture frame (B-frame) 412.

In a network encountering video frame loss, the loss of payload (data link layer frames) carrying video I-frames has a more serious effect on video quality than do the loss of payload carrying video P-frames. Furthermore, the loss of payload carrying video P-frames has a more serious effect on video quality than do the loss of payload carrying video B-frames.

In an embodiment, the data (video frame) type can correspond to drop precedence portion 54 of the data packet. In particular (for example) the video frame type can be indicated in a drop probability designation of a DiffServ field. Packets containing an I-frame are allocated the lowest probability of being dropped. Packets containing B-frames are allocated the highest probability of being dropped.

When the data type is determined to be video, data transmission characteristics are adapted in the link layer to improve the reliability of transmission of the video data relative to the reliability of transmission of other data. Further granularity in the adaptation of the data transmission characteristics can be implemented when the data type is further identified such as one of an I-frame, P-frame, or B-frame.

Figure 7A:
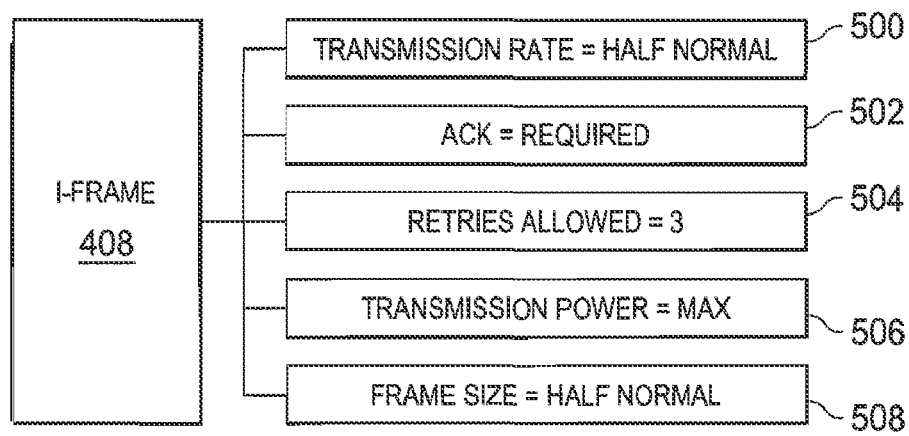
FIG. 7A is an example block relationship diagram of steps taken to increase the reliability of transmission of a type of data.
Figure 7B:
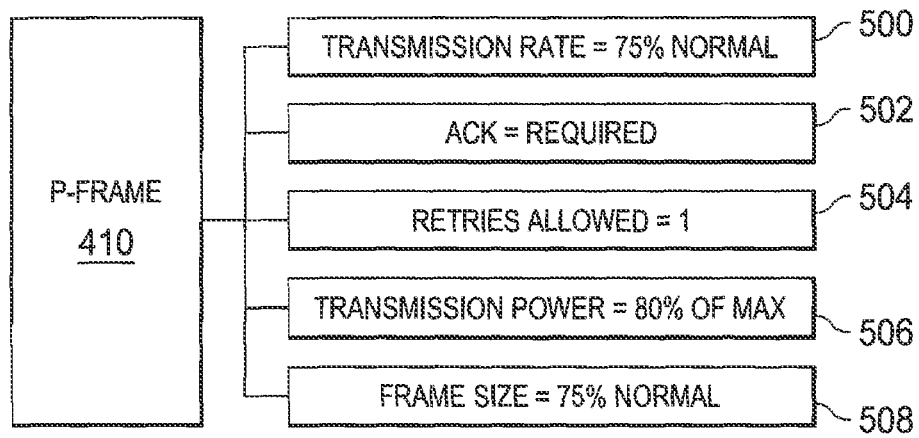
FIG. 7B is an example block relationship diagram of steps taken to increase the reliability of transmission of a type of data.
Figure 7C:
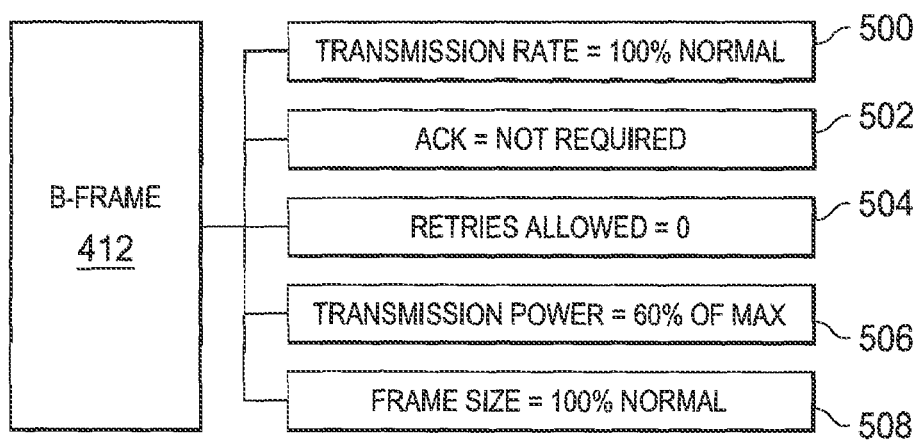
FIG. 7C is an example block relationship diagram of steps taken in a trade-off to decrease the reliability of transmission of one type of data in order to increase the reliability of transmission of another type of data.

FIGS. 7A-7C provide non-limiting examples of adaptation of data transmission characteristics according to the video data type. Other adaptations can be used. Referring to FIG. 7A, in an embodiment, when the data type is an I-frame 408 the transmission rate of the data in register 242 is reduced to, for example, half the normal transmission rate at step 500. An acknowledgement (ACK) flag (e.g., from register 232) is set to "acknowledgment required" at step 502. The allowable number of retries counter (or register) 234 is set at step 504 to the highest number, for example three. The transmission power setting in register 240 is set to, for example, a maximum value at step 506. A data frame size register can be reduced to, for example, half the normal frame size at step 508, or set at any other amount.

Referring to FIG. 7B, in an embodiment, when the data type is a P-frame the transmission rate in register 242 is reduced from the normal transmission rate, but still more than that of the I-frame rate, for example 75% of the normal transmission rate at step 500. The acknowledgement flag (e.g., from register 232) is set to "acknowledgement required" at step 502. The maximum number of retries allowed counter/register 234 is set to a lower number than that for the I-frame, for example one at step 504. The transmission power is set in register 240 to less than that of the I-frame, for example, 80% of maximum at step 506. Further, when the data is a P-frame 410 the frame size register 220 can be somewhat reduced to ensure reliability, but still greater in size than that of the I-frame at step 508.

Referring to FIG. 7C, in an embodiment, when the data is a B-frame 412, the data transmission rate in register 242 can be 100% of normal at step 500. The normal transmission rate would be regarded as whatever transmission rate the device determines is reliable between it and its destination, using normal techniques, at any given time. This normal transmission rate would then be reduced for certain types of data such as the I-frame or P-frame as described above.

Further when the data is a B-frame, the requirement for an acknowledgement flag (e.g., from register 232) would be set to "acknowledgement not required" at step 502. This may result in the receiving device being controlled so as to not send an acknowledgement. Furthermore, the transmission device would not expect an acknowledgement and would therefore not retry transmitting if the acknowledgement were not received. Thus, the retries allowed would be set to zero or it would not be relevant in this case.

The transmission power in register 240 of data of B-frames would be less than that of the I-frame and P-frame data types, and may in fact be less than the normal transmission power to allow power transmission to be averaged to be within regulatory requirements. The frame size register could be 100% of normal frame size sent with this type of data transmission at step 508.

In an embodiment, a receiver that receives data packets carrying I-frames that are received with errors would not send an acknowledgement and would prompt at least one retry (possibly more if necessary). P-frames received with errors are selectively acknowledged, which would not necessarily prompt a retry. B-frames would be acknowledged and, therefore, not be retried: even if received with errors.

Thus, in operation of an example flow, which is based on video frame type (I, P, or B), the system can transmit the data link layer frames at a lower bit rate than the channel itself can allow (e.g., tradeoff maximum throughput (with a greater probability of needing retransmission) for maximum reliability (deliberately reduce throughput but also reduce or eliminate retries)). In this case, I-frames could be transmitted at the lowest appropriate data rate in order to maximize reliability and, therefore, minimize retries. P-frames and B-frames could be transmitted at higher data rates with less reliability. One way of identifying frame content types could be to use the priority and drop precedence fields in DSCP. Priority could identify video and drop precedence could identify I, P, or B.

Further, assuming that IP packets carrying video are marked using DSCP, both the priority field and drop precedence field could be used to map into the number of permitted retries. As examples of transmitting video, I-frames could have a low drop precedence and could be allowed to be retried at least once (possibly more if necessary). P-frames could have a medium drop precedence and could be allowed to be retried only once. B-frames could have a high drop precedence and could be prohibited from being retried.

Such a concept could also be applied to the receiver acknowledging [ACK] (or not) errored frames it receives. As examples of receiving video, data frames carrying I-frames that are received with errors would not be ACKnowledged and would prompt at least one retry (possibly more if necessary). P-frames received with errors could be selectively ACKnowledged, which would not always prompt a retry. B-frames could be ACKnowledged and, therefore, not be retried, even if received with errors.

Again, the preceding concept could be applied at the transmitter for adapting transmit power on a per frame basis. In this case, data link frames that are carrying I-frames would be transmitted with a higher power while those carrying P-frames and/or B-frames would be transmitted at some reduced power. The intent would be to ensure that the average power transmitted was kept within regulatory limits even though individual frames would be transmitted at higher than nominal values.

It should be noted that the preceding ideas could be used in combination or individually applied. One particularly useful combination for maximizing reliability of a frame to be transmitted for the first time would be to reduce data rate, reduce frame size, and increase power. Although reducing data rate increases transmit time, a concurrent reduction of frame size reduces transmit time, thus allowing a higher transmit power to be used without violating regulatory requirements.

The preceding concepts can be applied to any communications protocol that can utilize bit rate adaptation, transmit power adaptation, and reliability via acknowledgements. Therefore, these concepts are not limited to 802.11. The concept is applicable to, for example, power-line data transmission.

Network device 100 is a transmitter element in one example implementation that executes some of the data transmission activities, as explained herein. In other scenarios, network device could be virtually any network element, a proprietary device, or anything that is capable of facilitating an exchange or coordination of data. As used herein in this Specification, the term 'network device' is meant to encompass switches, servers, routers, gateways, base stations, bridges, loadbalancers, or any other suitable device, network appliance, component, element, or object operable to exchange or process information in a data transmission environment. Moreover, the network device may include any suitable hardware, software, components, modules, interfaces, or objects that facilitate the operations thereof. This may be inclusive of appropriate algorithms and communication protocols that allow for the effective delivery and coordination of data or information.

Thus, a network device (such as those depicted in the FIGURES) can be equipped with appropriate software to execute the described operations in an example embodiment of the present invention. Memory elements and processors (which facilitate these outlined operations) may be included in this device or be provided externally to this device, or consolidated in any suitable fashion. The processors can readily execute code (software) for effectuating the activities described.

The memory elements can store information to be referenced by the network device. As used herein in this document, the term 'memory element' is inclusive of any suitable database or storage medium (provided in any appropriate format) that is capable of maintaining information pertinent to the coordination and/or processing operations of the network device. For example, the memory elements may store such information in an electronic register, diagram, record, index, list, or queue. Alternatively, the memory elements may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

As identified earlier, in one example implementation, the network device includes software to achieve the optimal data transmission operations, as outlined herein in this document. Additionally, a second network device (e.g., a receiver) may include some software (e.g., reciprocating software or software that assists in the processing of data, etc.) to help coordinate the data transmission activities explained herein. In other embodiments, this processing and/or coordination feature may be provided external to these devices or included in some other device to achieve this intended functionality. Alternatively, both the network device and the peer device include this software (or reciprocating software) that can coordinate in order to achieve the operations, as outlined herein.

Note that with the examples provided herein, interaction may be described in terms of two or three elements. However, this has been done for purposes of clarity and example only. In certain cases, it may be easier to describe one or more of the functionalities of a given set of flows by only referencing a limited number of network devices. It should be appreciated that the system (and its teachings) are readily scalable and can accommodate a large number of network devices, as well as more complicated/sophisticated arrangements and configurations. Accordingly, the examples provided should not limit the scope or inhibit the broad teachings of the system, as potentially applied to a myriad of other architectures.

It is also important to note that the steps in preceding FIGURES illustrate only some of the possible scenarios that may be executed by, or within, the system. Some of these steps may be deleted or removed where appropriate, or these steps may be modified or changed considerably without departing from the scope of the described concept. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the system in that any suitable arrangements, chronologies, configurations, and timing mechanisms may be provided without departing from the teachings of the described concept.

Although the presented concept has been described in detail with reference to particular embodiments, it should be understood that various other changes, substitutions, and alterations may be made hereto without departing from the spirit and scope of the described concept. For example, although the presented concept has been described as operating in video environments or arrangements, the described concept may be used in any communications environment that could benefit from such technology. Virtually any configuration that seeks to intelligently provision data transmission could enjoy the benefits of the described concept.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112a as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
   identifying a first data type of a first payload of a first data packet to be transmitted as part of a flow, wherein the first data type is identified by evaluating a quality of service (QoS) field;
   setting an acknowledgement flag based on the first data type, the acknowledgement flag indicating that an acknowledgement is not required from a receiving device such that a network device avoids retransmitting a first outgoing frame when the acknowledgement is not received for the first outgoing frame;
   identifying a second data type of a payload of a second data packet to be transmitted as part of the flow, wherein the second data type is identified by evaluating the quality of service (QoS) field and the acknowledgement flag is not set;
   transmitting a second outgoing frame using first transmission characteristics; and
   retransmitting the second outgoing frame when the acknowledgement is not received using second transmission characteristics, wherein the second transmission characteristics are different than the first transmission characteristics.

2. The method of claim 1, wherein the acknowledgement flag is provided in the first outgoing frame.

3. The method of claim 1, further comprising:
   adapting a data transmission rate according to the first data type, wherein a packet size for selected packets of the flow is changed based on identifying the first data type; and
   changing a transmission power for the flow on a per-frame basis, wherein the transmission power is configured according to the first data type such that high-priority packets are transmitted with a higher power than low priority packets, which are transmitted at a reduced power.

4. The method of claim 1, wherein data transmission rates are controlled by one or more link layer configuration parameters, which are controlled according to the first data type.

5. The method of claim 1, further comprising:
   transmitting the first outgoing frame at a first transmission power level, wherein the first transmission power level is less than an average transmission power level; and
   transmitting a third outgoing frame at a third transmission power level, wherein the third transmission power level is greater than the average transmission power level.

6. The method of claim 1, wherein the second transmission characteristics include a selected one or more of a group of transmission characteristics, the group consisting of:
   a) a data transmission rate characteristic;
   b) a transmission power characteristic; and
   c) a packet size characteristic.

7. Logic encoded in non-transitory media that includes code for execution and when executed by a processor operable to perform operations comprising:
   identifying a first data type of a first payload of a first data packet to be transmitted as part of a flow, wherein the first data type is identified by evaluating a quality of service (QoS) field;
   setting an acknowledgement flag based on the first data type, the acknowledgement flag to indicate that an acknowledgement is not required from a receiving device such that a network device avoids retransmitting a first outgoing frame when the acknowledgement is not received for the first outgoing frame:
   identifying a second data type of a payload of a second data packet to be transmitted as part of the flow, wherein the second data type is identified by evaluating the quality of service (QoS) field and the acknowledgement flag is not set;
   transmitting a second outgoing frame using first transmission characteristics; and
   retransmitting the second outgoing frame when the acknowledgement is not received using second transmission characteristics, wherein the second transmission characteristics are different than the first transmission characteristics.

8. The logic of claim 7, wherein the acknowledgement flag is provided in the first outgoing frame.

9. The logic of claim 7, the operations further comprising:
   adapting a data transmission rate according to the first data type, wherein a packet size for selected packets of the flow is changed based on identifying the first data type; and
   changing a transmission power for the flow on a per-frame basis, wherein the transmission power is configured according to the first data type such that high-priority packets are transmitted with a higher power than low priority packets, which are transmitted at a reduced power.

10. The logic of claim 7, wherein data transmission rates are controlled by one or more link layer configuration parameters, which are controlled according to the first data type.

11. The logic of claim 7, the operations further comprising:
    transmitting the first outgoing frame at a first transmission power level, wherein the first transmission power level is less than an average transmission power level; and
    transmitting a third outgoing frame at a third transmission power level, wherein the third transmission power level is greater than the average transmission power level.

12. The logic of claim 7, wherein the second transmission characteristics include a selected one or more of a group of transmission characteristics, the group consisting of:
    a) a data transmission rate characteristic;
    b) a transmission power characteristic; and
    c) a packet size characteristic.

13. An apparatus, comprising:
    a memory element configured to store electronic code; and
    a processor operable to execute instructions associated with the electronic code, wherein the processor is configured to interface with the memory element such that the apparatus is configured for:

identifying a first data type of a first payload of a first data packet to be transmitted as part of a flow, wherein the first data type is identified by evaluating a quality of service (QoS) field;

setting an acknowledgement flag based on the first data type, the acknowledgement flag to indicate that an acknowledgement is not required from a receiving device such that a network device avoids retransmitting a first outgoing frame when the acknowledgement is not received for the first outgoing frame;

identifying a second data type of a payload of a second data packet to be transmitted as part of the flow, wherein the second data type is identified by evaluating the quality of service (QoS) field and the acknowledgement flag is not set;

transmitting a second outgoing frame using first transmission characteristics; and retransmitting the second outgoing frame when the acknowledgement is not received using second transmission characteristics, wherein the second transmission characteristics are different than the first transmission characteristics.

14. The apparatus of claim 13, wherein the acknowledgement flag is provided in the first outgoing frame.

15. The apparatus of claim 13, wherein the apparatus is further configured for:

adapting a data transmission rate according to the first data type, wherein a packet size for selected packets of the flow is changed based on identifying the first data type; and changing a transmission power for the flow on a per-frame basis, wherein the transmission power is configured according to the first data type such that high-priority packets are transmitted with a higher power than low priority packets, which are transmitted at a reduced power.

16. The apparatus of claim 13, wherein data transmission rates are controlled by one or more link layer configuration parameters, which are controlled according to the first data type.

17. The apparatus of claim 13, wherein the apparatus is further configured for:

transmitting the first outgoing frame at a first transmission power level, wherein the first transmission power level is less than an average transmission power level; and transmitting a third outgoing frame at a third transmission power level, wherein the third transmission power level is greater than the average transmission power level.

* * * * *